United States Patent [19]
Hosford

[11] Patent Number: 5,943,328
[45] Date of Patent: Aug. 24, 1999

[54] FRAME COUNTER FOR SYNCHRONIZED COMMUNICATION

[75] Inventor: Mark J. Hosford, San Diego, Calif.

[73] Assignee: Lucent Technologies Inc., Murray Hill, N.J.

[21] Appl. No.: 08/696,452

[22] Filed: Aug. 13, 1996

[51] Int. Cl.$^6$ ................................. H04Q 7/00; H04J 3/06
[52] U.S. Cl. .......................... 370/331; 370/350; 375/354; 455/502
[58] Field of Search ..................................... 370/328–333, 370/350, 326, 503, 506; 375/356, 354; 455/39, 500, 507, 517, 524, 436, 502, 442

[56] References Cited

U.S. PATENT DOCUMENTS

| | | | |
|---|---|---|---|
| 5,177,740 | 1/1993 | Toy et al. ................................. | 370/350 |
| 5,301,194 | 4/1994 | Seta ........................................ | 370/350 |
| 5,363,373 | 11/1994 | Nakahara et al. ....................... | 370/350 |
| 5,434,905 | 7/1995 | Maeda et al. ........................... | 370/350 |
| 5,550,829 | 8/1996 | Wang ...................................... | 370/350 |
| 5,555,247 | 9/1996 | Matsuoka et al. ...................... | 370/350 |

OTHER PUBLICATIONS

Anderson, Ross, "Academic freedom under threat over the A5 algorithm.", Ross.Anderson@cl.cam.ac.uk, May 30, 1994, pp. 1–9.

Anderson, Ross, "A5—The GSM Encryption Algorithm", http://chem.leeds.ac.uk/ICAMS/people/jon/a5.html, Jun. 17, 1994.

Chambers, John M., "Computational Methods for Data Analysis", John Wiley & Sons, Inc., 1977, pp. 161–175.

Knuth, Donald E., "The Art of Computer Programming", 2nd Ed., Addison–Wesley Publishing Company, Inc., 1981, pp. 9–10.

Mouly, Michael and Pautet, Marie–Bernadette, "The GSM System for Mobile Communications", pub. M. Mouly et Marie–B. Pautet, Palaiseau, France, 1992, pp. 7,248–249, 478–493.

Telecommunications Industry Association (TIA), TIA/EIA/IS–130, Apr. 1995, 800 MHz Cellular Systems, TDMA Radio Interface, Radio Link Protocol 1, pp. i, ii, iii, 7, 43, and 44.

*Primary Examiner*—Douglas W. Olms
*Assistant Examiner*—Seema S. Rao
*Attorney, Agent, or Firm*—Morgan & Finnegan, LLP

[57] ABSTRACT

Synchronized communication is provided between a first station and a second station. The first station sets a frame counter to a stored initial value, receives a frame including an identifier uniquely identifying a communication channel designated for communication between the first station and the second station, and increments the frame counter. The frame counter is aperiodically reset to a new initial value, the new initial value being a substantially random number with respect to a previous initial value. When wireless communication is employed, the identifier may be a color code. If the value of the identifier is an expected value, the first station transmits to the second station a return frame including an expected value as a return frame identifier. If the value of the identifier is other than the expected value, the first station resets the frame counter and transmits to the second station a return frame including a selected value other than an expected value as a return frame identifier. A reset counter is incremented after the frame counter is reset. After a predetermined error interval has elapsed since the first occurrence of the step of incrementing the reset counter, and the reset counter has not reached a predetermined value, the reset counter is reset.

25 Claims, 7 Drawing Sheets

FCM=FCM + 1
FIG. 5B FCB=FCB + 1 
  RESET FCM
FIG. 6B RESET FCB 
  RESET FCM
FIG. 6D FCB=FCB + 1 
  FCM=FCM + 1

RESET FCM
FIG. 7B RESET FCB 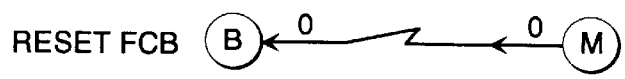
  RESET FCM
FIG. 7D RESET FCB 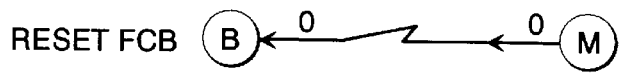
  RESET FCM
FIG. 7F FCB=FCB + 1 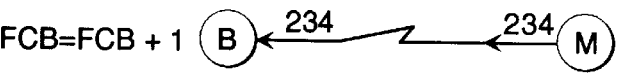
  FCM=FCM + 1

FRAME COUNTER FOR SYNCHRONIZED COMMUNICATION

FIELD OF THE INVENTION

The present invention is directed to a system using a synchronized communication protocol between two entities, more specifically, to provision of a frame counter for message sequence synchronization in a communication protocol useful in mobile cellular communications.

BACKGROUND OF THE INVENTION

Conventional wireless communication protocols used by mobile stations are not concerned with assuring message sequence synchronization between a transmitting station and a receiving station. This has been satisfactory when the messages represent spoken communications, because the receiving person simply asks the other party to repeat an unclear utterance. Similarly, lack of message sequence synchronization has not been a concern for the relatively simple data services which have been the major users of wireless communications, such as paging systems.

However, for more complicated data applications, it is helpful if the wireless communication protocol provides at least a rudimentary form of message sequence synchronization. Unfortunately, since existing protocols were defined without a need to provide message sequence synchronization, there is no particular provision made for providing message sequence synchronization.

SUMMARY OF THE INVENTION

In accordance with the present invention, synchronized wireless communication is provided between a first station and a second station. The first station receives a frame including an identifier uniquely identifying a communication channel designated for communication between the first station and the second station, and increments a frame counter which is aperiodically reset to a new initial value, the new initial value being a substantially random number with respect to a previous initial value.

The identifier may be a color code. The first station may transmit, to the second station, a return frame including an expected value as a return frame identifier.

The frame counter may be reset when the value of the identifier in the received frame is other than an expected value. The first station may transmit, to the second station, a return frame including a selected value other than an expected value as a return frame identifier after resetting the frame counter. A reset counter may be incremented after the frame counter is reset. After a predetermined error interval has elapsed since the first occurrence of the step of incrementing the reset counter, and the reset counter has not reached a predetermined value, the reset counter may be reset.

Also in accordance with the present invention, synchronized communication is provided between a first station and a second station. The first station receives a frame including an identifier uniquely identifying a communication channel designated for communication between the first station and the second station, and increments a frame counter which is aperiodically reset to a new initial value, the new initial value being a substantially random number with respect to a previous initial value.

It is not intended that the invention be summarized here in its entirety. Rather, further features, aspects and advantages of the invention are set forth in or are apparent from the following description and drawings.

BRIEF DESCRIPTION OF THE FIGURES

FIGS. 5A–5B, 6A–6E and 7A–7G are charts to which reference is made in explaining operation according to the flowchart of FIG. 2A.

DETAILED DESCRIPTION

Provision of message sequence synchronization will be described using the IS 136 Revision A wireless communication protocol. The specification for the IS 136 Revision A protocol, approved for publication in February 1996, is available from the Telecommunications Industry Association, 2500 Wilson Boulevard, Arlington, Va. 22201.

The communication software at each of a first station, and a second station communicating with the first station, is modified to count the number of frames received with a unique identifier having an expected value. If a frame is received with an erroneous unique identifier, that is, a unique identifier having other than the expected value, the receiving station (either the first station or the second station) resets its counter of received frames and sends an incorrect unique identifier to force the transmitting station (the other of the first and second stations) to reset its received frame counter. The frame counter is aperiodically reset to a new initial value which is a substantially random number with respect to a previous initial value. The transmitting station then essentially notifies the receiving station that it has reset its frame counter, and both stations are in synchronization again.

Figure 1A:
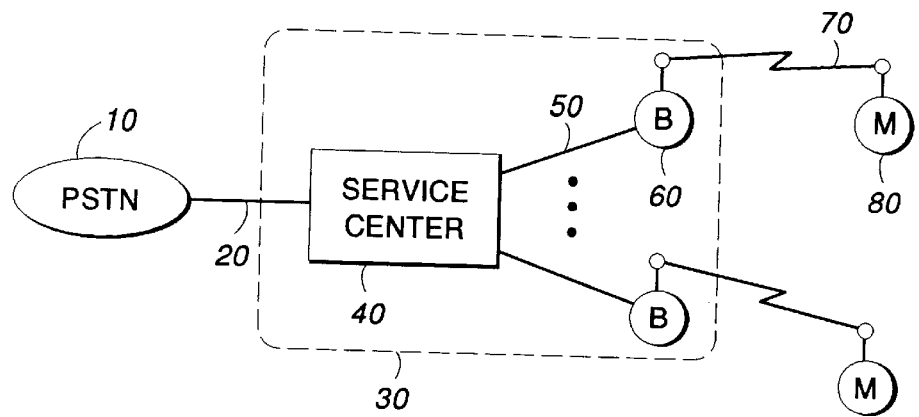
FIG. 1A is a block diagram of the communications environment in which the present invention may be practiced.

The environment in which communication occurs is shown in FIG. 1A. Public switched telephone network (PSTN) 10 is coupled via at least one wireline 20 to wireless communication system 30 comprising service center 40 coupled via respective wirelines 50 to a plurality of base stations 60. Base station 60 is adapted to provide wireless communication links 70 between itself and a plurality of mobile stations 80. As is well known, each base station 60 defines a communications cell, and mobile stations 80 may roam among cells.

Figure 1B:
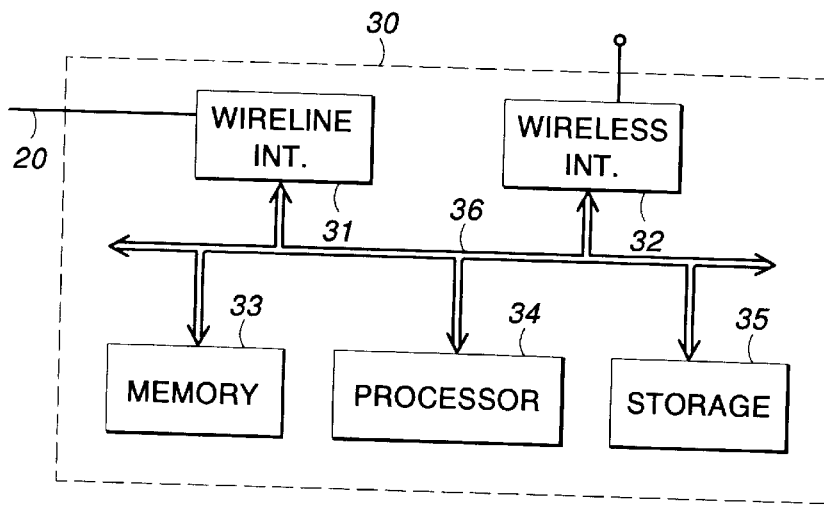
FIG. 1B is a block diagram of the wireless communication system to which the present invention is applied.

Fig. 1B shows the wireless communications system 30 in more detail. Wireline interface 31 functions to provide a communications interface to PSTN 10. Wireless interface 32 acts as a communications interface to mobile stations 80. As will be understood by one of ordinary skill in the art, memory 33, processor 34, storage 35 and communication link 36 function to control and enable communications to and from users of mobile stations 80. The mapping of the elements of FIG. 1B to service center 40, wirelines 50 and base stations 60 of FIG. 1A is not critical, and so will not be described in further detail.

In the embodiments described below, the base station is assumed to include the radio equipment. In other embodiments, the radio equipment is not co-located with the base station. In these other embodiments, memory 33, processor 34 and storage 35 may be entirely at the base station, entirely at the radio station or at both locations, with the functions positioned at the radio equipment or base station in view of network delays which in turn depend on specific manufacturing implementations.

Figure 1C:
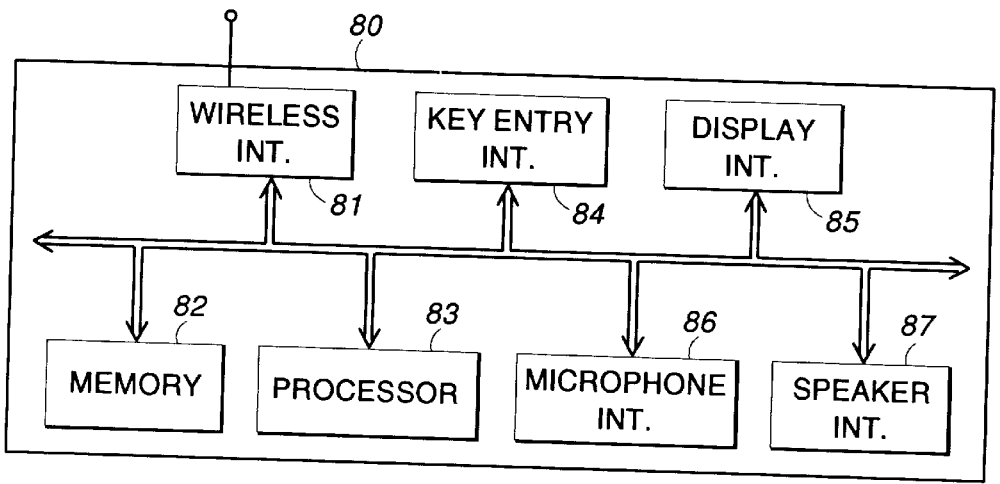
FIG. 1C is a block diagram of the mobile station to which the present invention is applied.

FIG. 1C shows mobile station 80 in more detail. Wireless interface 81 functions to provide a communications interface to wireless communications system 30. Memory 82 and processor 83 co-operate to control and enable communications with a user of mobile station 80. Keyboard interface 84 is adapted for data entry using a predefined keyboard, such as a telephone handset keyboard or a typewriter keyboard. Display interface 85 is adapted to provide a visual display, such as text, to the user of mobile station 80. Microphone 86 is adapted to receive audible communications from the user of mobile station 80, such as speech or tones generated by a separate device (not shown). Speaker 87 is adapted to generate acoustic signals, such as audible signals directed to the user of mobile station 80. The elements of mobile station 80 communicate via bus 88. Mobile station 80 need not include all of these elements. All of the elements shown in FIG. 1C are conventional, and so will not be described further.

As will be described in detail below, when mobile station 80 is in the communication area of base station 60, a registration process occurs.

After registration, if a traffic channel is required so that base station 60 and mobile station 80 can transmit user messages, such as a telephone call, wireless communications system 30 selects a channel and, via base station 60, informs mobile station 80 of the channel and its unique identifier. Base station 60 and mobile station 80 then include the unique identifier in each frame transmitted therebetween so that the traffic channel for the frame may be readily distinguished. These procedures, sometimes referred to as "call processing", are described in Sections 1.2.5 and 2.4.3 of volume 1 of IS 136 Revision A.

According to IS 136 Revision A, the unique identifier of the traffic channel included in each frame is referred to as a Digital Verification Color Code (DVCC). The color code is transmitted with error detection bits, such as cyclic redundancy check (CRC) bits; the CRC-protected color code is referred to as a Coded Digital Verification Color Code (CDVCC). To practice the present invention, a non-zero color code is typically used, allowing a color code having a zero value to act essentially as a control flag.

The color code is used in detection of traffic channel errors and anomalies on a frame by frame basis. Consequently, the CRC encoding need provide only error detection. Provision of error correction capability for the color code is undesirable, since error correction would mask occurrences of errors.

For exemplary purposes, let it be assumed that the chosen color code is "234".

To practice the inventive technique, base station 60 and mobile station 80 are modified to include a counter of received frames. The frame counter maintained at base station 60 of frames received from mobile station 80 is referred to herein as "FCB". The frame counter maintained at mobile station 80 of frames received from base station 60 is referred to herein as "FCM". Each frame counter may be, for example, a 24 bit binary number having a range of values from 0 to $2^{24}-1$, that is, a sufficient range of values to accommodate even very long conversations. The exemplary range corresponds to a conversation in excess of 100 years. Increasing the number of bits in the frame counter to, for example, 520 bits increases the difficulty of unauthorized decryption. When a frame is received with its color code having the expected value, herein "234" for the particular traffic channel, then the received frame counter is incremented at the receiving device. Otherwise, the frame counter is reset.

Typically, the frame counter is incremented by one. It is recognized that any increment may be used, including an increment which varies from frame to frame, as long as the transmitting and receiving stations each operate to select the same increment at each instance of incrementing the frame counter. Thereby, the transmitting and receiving stations can independently create each others' frame counters.

It is an important feature of the present invention that the initial value of the frame counter may be chosen to be any initial value in the allowed range. This is particularly useful when the frame counter is used in encrypting messages, as described in U.S. patent application Ser. No. 08/696,300, filed on Aug. 13, 1996, now pending. More specifically, when the initial value is chosen to be "N", the frame counter is incremented beginning from "N" until its value reaches $2^{24}$, then the frame counter "rolls over" to zero and is incremented until it reaches "N".

It is an important feature of the present invention that the frame counter may be reset to its initial value from time to time during a communication session between the transmitting and receiving stations. This is useful to re-synchronize the communicating stations. This is also useful in certain applications, such as modulating a key used in encrypting messages, in particular, to increase the difficulty of unauthorized decrypting of the encrypted message.

Figure 2A:
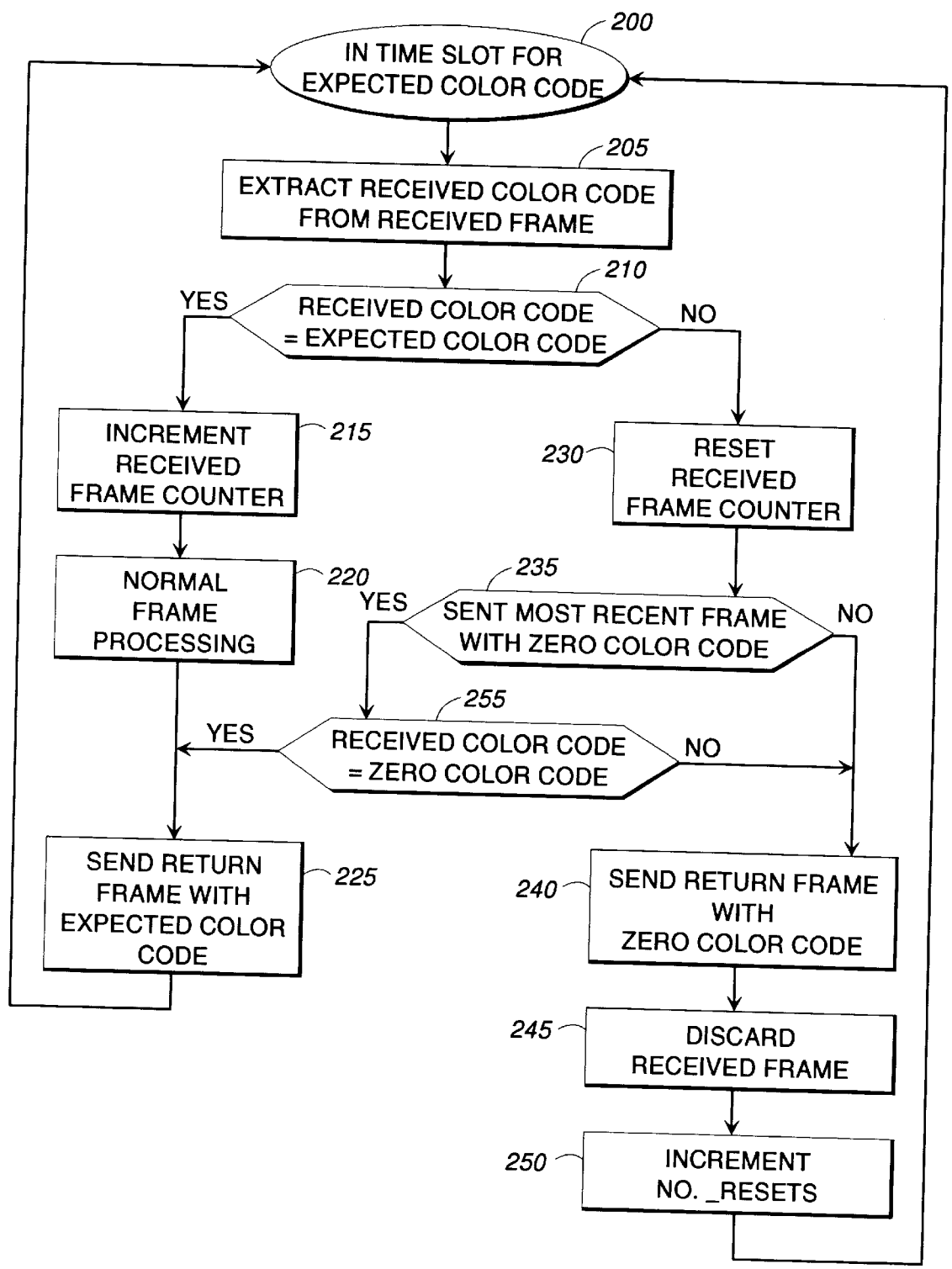
FIGS. 2A and 2B are flowcharts illustrating use of a frame counter according to the present invention.
Figure 2B:
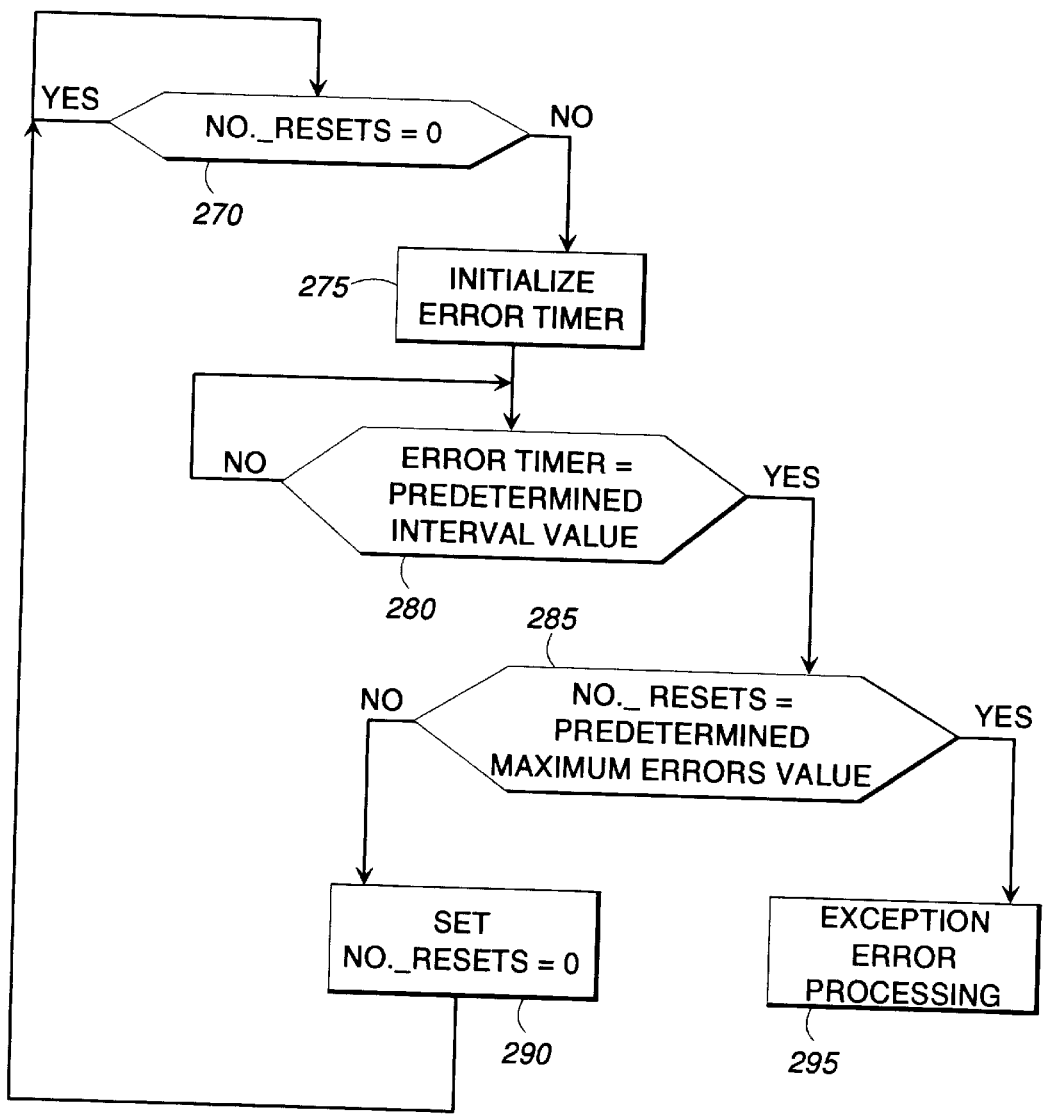
Figure 3:
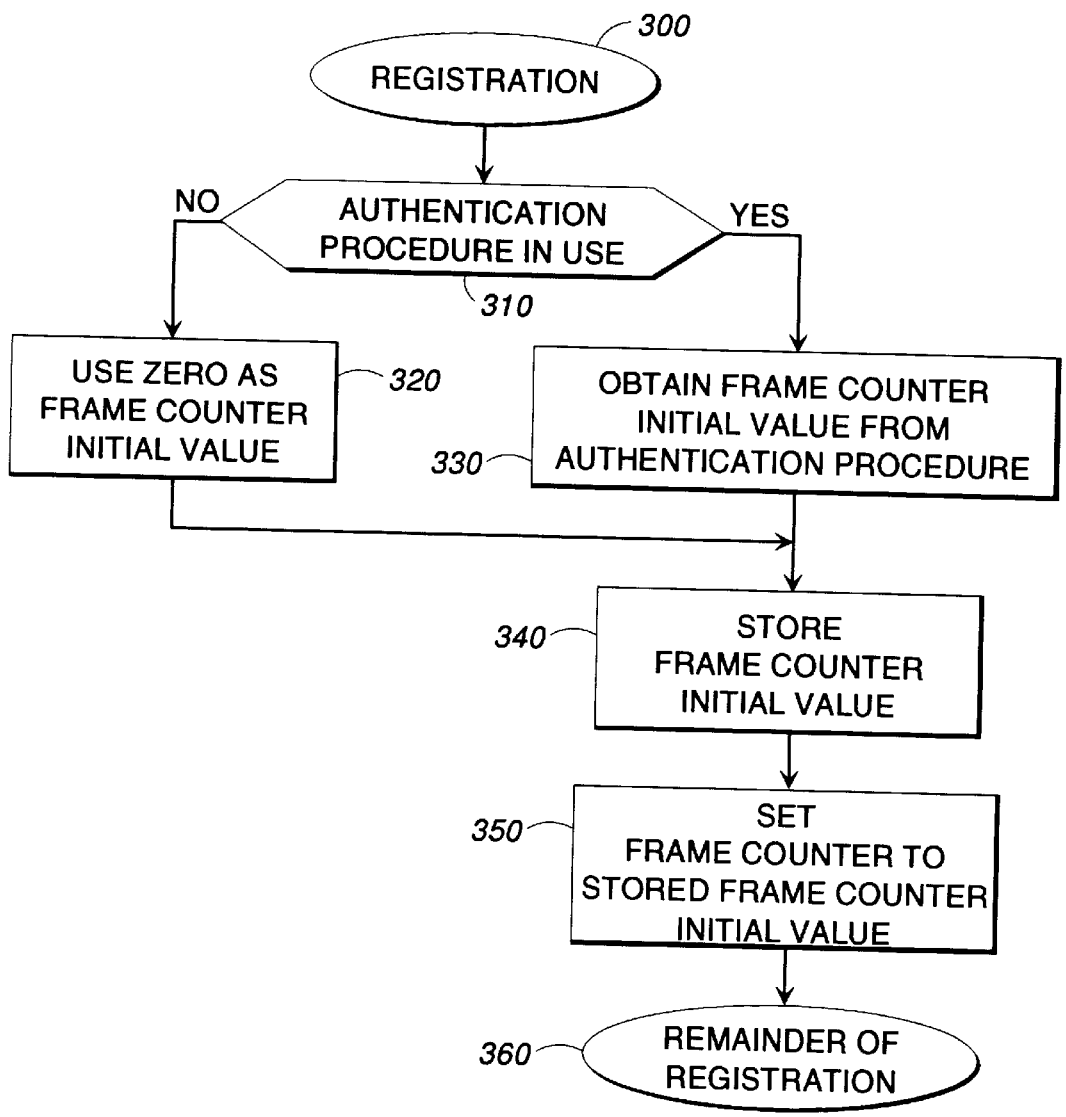
FIG. 3 is a flowchart illustrating frame counter initialization during registration.
Figure 4:
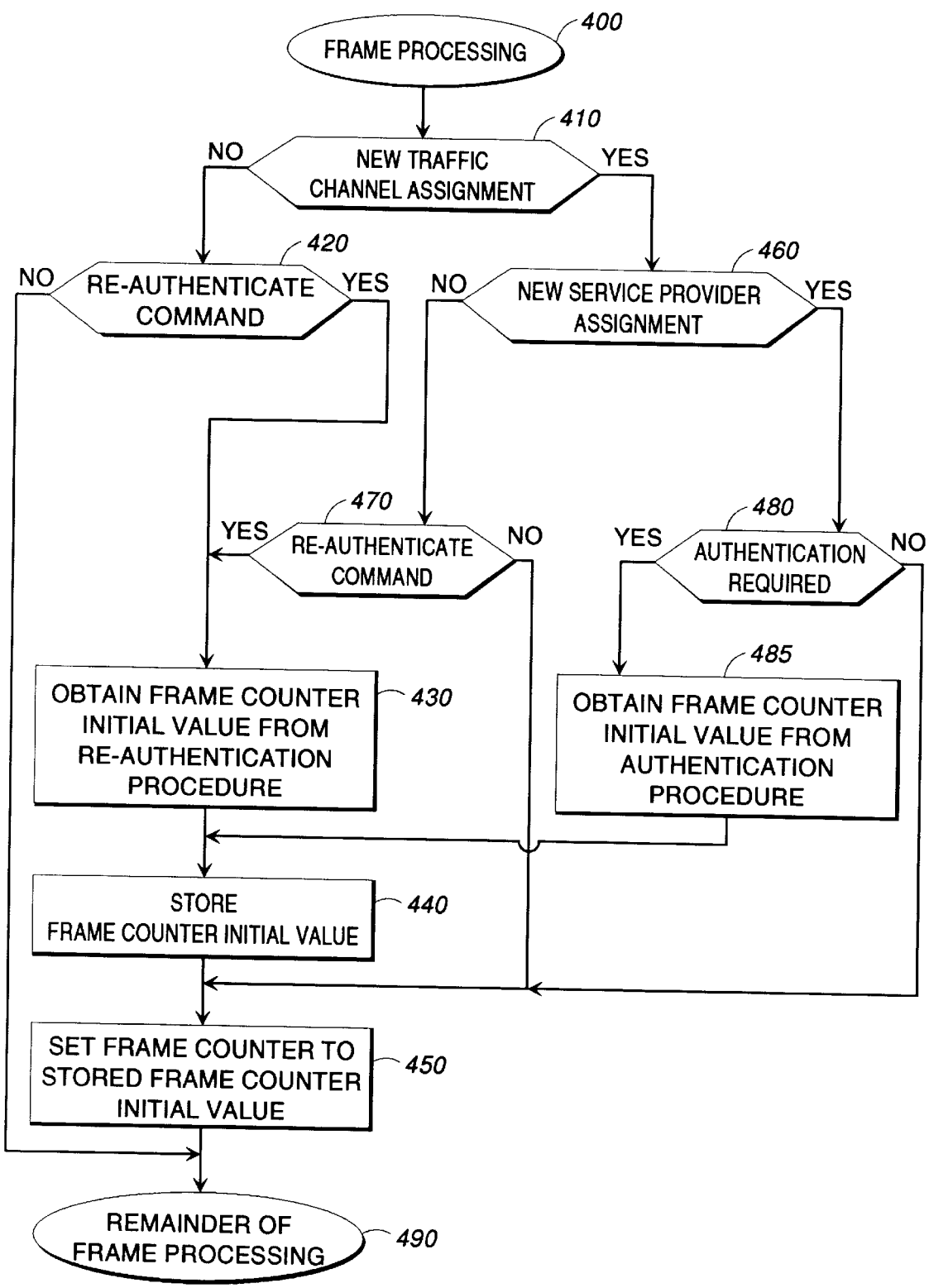
FIG. 4 is a flowchart illustrating frame counter resetting after registration.

FIGS. 2A–2B show flowcharts depicting use of the frame counter. FIG. 3 illustrates frame counter initialization during registration. FIG. 4 illustrates frame counter resetting after registration. FIGS. 2A, 2B, 3 and 4 describe operation at each of the transmitting station and the receiving station.

Figure 5A:
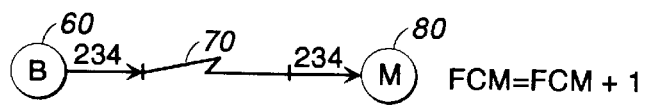

FIGS. 2A–2B will be explained with reference to FIGS. 5A–5B illustrating normal operation, FIGS. 6A–6E illustrating one or two sequential errors in the wireless communication channel 70, and FIGS. 7A–7G illustrating three or four sequential errors in the wireless communication channel 70.

The case of normal operation will now be described.

As shown in FIG. 5A, base station 60 sends a frame including color code "234" to mobile station 80 via wireless communication channel 70. At step 200 of FIG. 2A, mobile station 80 commences processing of a frame which it expects to include a color code having a value of "234".

At step 205, mobile station 80 extracts the color code from the received frame. In particular, mobile station 80 finds an encoded color code CDVCC in the received frame and decodes it to obtain a received color code DVCC.

At step 210, mobile station 80 determines whether the received color code has the expected value of "234". In this case, the received color code has the expected color code value, so mobile station 80 proceeds to step 215 and increments its received frame counter FCM by one. At step 220, mobile station 80 proceeds with its usual processing for the received frame.

At step 225, mobile station 80 transmits a return frame to base station 60, embedding a color code "234" in the transmitted frame, as shown in FIG. 3B. According to IS 136 Revision A, mobile station 80 has approximately 400 clock cycles of a clock used with processor 83 in FIG. 1C to receive a frame, examine the color code and decide what to send as the color code in the return frame. The length of a clock cycle may vary by processor and by mobile station manufacturer.

Meanwhile, as shown in FIG. 5B, when base station 60 receives the frame transmitted by mobile station 80 at step 225, base station 60 processes the frame as generally described above with respect to steps 200–225 of FIG. 2A, and so increments its frame counter FCB.

As will be appreciated, each of the transmitting and receiving stations has a frame counter whose value changes monotonically with each correctly received frame, and which can operate with the conventionally defined IS 136 Revision A protocol.

The case of one or two sequential errors in transmission will now be described.

Figure 6A:
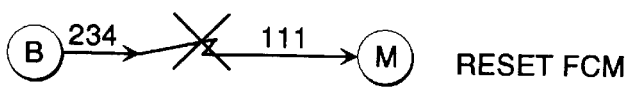

As shown in FIG. 6A, base station 60 transmits a frame with the expected color code, namely, "234", via wireless communication channel 70 to mobile station 80. However, an error is assumed to occur, such as from noise or degraded signal conditions in wireless communication channel 70, so that mobile station 80 receives a corrupted color code, such as "111". This type of error is often referred to as a "reception error"; in contrast, a "transmission error" is an error introduced by the transmitting station, herein base station 60.

At steps 200–210 of FIG. 2A, mobile station 80 extracts and decodes the received color code value, "111", and determines that it does not match the expected color code value, "234". So, mobile station 80 proceeds to step 230, and resets its frame counter, FCM, to its initial value, assumed to be zero. At step 235, mobile station 80 checks whether it sent a color code of "0" in the immediately preceding frame. At this point in the example, the immediately preceding frame was transmitted normally, that is, with a color code of "234", so the "NO" branch is taken from step 235.

Consequently, mobile station 80 proceeds to step 240. When mobile station 80 next transmits a frame, it embeds a selected value other than the expected value "234" as the color code, for example, a selected value of "0", in the next transmitted frame, as shown in FIG. 6B. At step 245, mobile station 80 discards the received frame because it has determined that the frame is erroneous. Then, at step 250, mobile station 80 increments a counter NO._RESETS of the number of times its received frame counter FCM has been reset, and proceeds to step 200 to wait for the next frame from base station 60. Use of the counter NO._RESETS is explained below.

Meanwhile, as shown in FIG. 6B, when base station 60 receives the frame transmitted by mobile station 80 at step 240, base station 60 processes the frame as generally described above with respect to steps 200–210 and 230–250 of FIG. 2. It will be noted that the important feature of the received color code is that it does not match the value expected by base station 60, so that even if the transmitted color code "0" is corrupted to something else, such as "55", the same processing occurs. The result of the processing at steps 200–210 and 230–250 is that base station 60 resets FCB, that is, sets FCB=0, and transmits a frame with the color code "0" to mobile station 80, as shown in FIG. 6C.

Figure 6C:
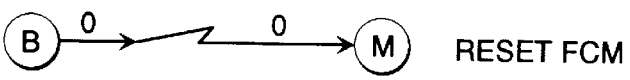

As shown in FIG. 6C, let it be assumed that the color code "0" is correctly transmitted via wireless communication channel 70 to mobile station 80. At steps 200–210 of FIG. 2A, mobile station 80 extracts the received color code value, "0", and determines that it does not match the expected color code value, "234". So, mobile station 80 proceeds to step 230 and resets its frame counter, FCM=0. At step 235, mobile station 80 checks whether it sent a color code of "0" in the immediately preceding frame. At this point in the example, the immediately preceding frame was transmitted with a color code of "0", so the "YES" branch is taken from step 235.

Consequently, mobile station 80 proceeds to step 255 and checks whether that the received color code has a value of "0". In this case, the received color code has a value of "0". Mobile station 80 effectively interprets this as an acknowledgement from the transmitting station, herein base station 60, that base station 60 has reset its frame counter FCB. Therefore, the frame counters FCB and FCM are in synchronization, specifically, both have been reset. So mobile station 80 returns to normal operation at step 225.

Figure 6E:
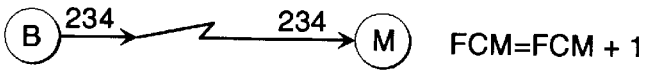

As a result of executing step 225, mobile station 80 transmits a color code of "234", as shown in FIG. 6D. When base station 60 receives the frame transmitted by mobile station 80 at step 225, base station 60 processes the frame as generally described above with respect to steps 200–225 of FIG. 2A. As shown in FIG. 6E, base station 60 sends the expected color code "234" to mobile station 80.

The case of three or four sequential errors in transmission will now be described.

Figure 7A:
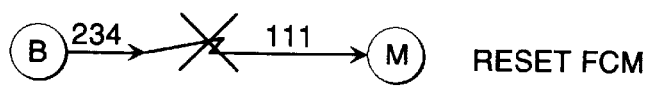

FIGS. 7A–7B are similar to FIGS. 6A–6B, and, for brevity, the corresponding processing will not be described.

Figure 7C:
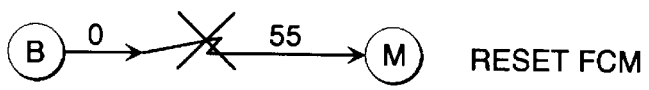

In FIG. 7C, base station 60 sends a color code "0" to mobile station 80; however, wireless communication channel 70 corrupts this to a value other than "0" or "234", herein, "55". Mobile station 80 proceeds through steps 200, 205, 210, 230, and 255 of FIG. 2A, in similar fashion as described above, but takes the "NO" branch at step 255. Effectively, since the transmitted color code of "0" was corrupted to "55", mobile station 80 understands that an effective acknowledgement has not been received from base station 60, so mobile station 80 proceeds to step 240, where it tries to force base station 60 to reset its frame counter.

Figure 7E:
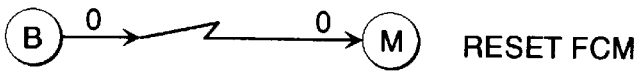
Figure 7G:
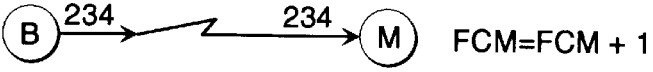

As shown in FIG. 7D, the color code "0" generated by mobile station 80 at step 240 is transmitted to base station 60. At this point, base station 60 is in a comparable state to that shown in FIG. 6B. Thus, the processing in FIGS. 7E–7G is similar to that already described for FIGS. 6C–6E, respectively, and, for brevity, will not be repeated.

Each of the transmitting and receiving stations is assumed to have a counter NO._RESETS dedicated to their communication link. That is, mobile station 80 has one counter NO._RESETS for the traffic channel in which base station 60 is its partner, whereas base station 60 has a plurality of counters NO._RESETS(n), where "n" is the number of mobile stations 80 currently communicating therewith. Each of the counters is used in similar manner.

Use of the counter NO._RESETS at mobile station 80 will now be explained with reference to FIG. 2B.

Memory 82, shown in FIG. 1C, of mobile station 80 is assumed to have a location designated for use as the counter NO._RESETS. When power is applied to mobile station 80, its start-up routine stores a value of zero in the location for the counter NO._RESETS. Frequently, such as at least once per frame, software stored in memory 82 and represented by the flowchart of FIG. 2B is executed by processor 83.

Generally, processor 83 of mobile station 80 executes step 270, at which it checks the value stored in the location for the counter NO._RESETS, and determines that the value is zero, so processor 83 proceeds along the "YES" branch back to step 270 and waits for the next execution of the software shown in FIG. 2B.

However, after mobile station 80 has detected an erroneous frame, such as described above with respect to FIGS. 6A and 7A, and has executed step 250 of FIG. 2A, the value of NO._RESETS is non-zero. So, the next time mobile station 80 executes step 270 of FIG. 2B, the "NO" branch is taken from step 270.

Essentially, after an erroneous frame is detected, mobile station 80 proceeds to step 275 of FIG. 2B and initializes an interval timer ERROR TIMER, for example, sets ERROR TIMER to zero. Thereafter, ERROR TIMER is incremented as time passes. Mobile station 80 proceeds to step 280 and checks whether ERROR TIMER has reached a predetermined interval value. If not, mobile station 80 resumes its other processing. The next time that the software represented by FIG. 2B is executed, mobile station 80 again executes step 280.

Eventually, the predetermined time interval will have elapsed, so mobile station 80 proceeds from the "YES" branch of step 280 to step 285, and checks whether the value of NO._RESETS is a predetermined value representing the maximum number of tolerable errors during the predetermined time interval measured by ERROR TIMER. It will be appreciated that the interval value for ERROR TIMER and the maximum errors value NO._RESESTS are determined when the software represented by FIG. 2B is loaded into memory 82 of mobile station 80.

In a modification, base station 60 sends a new interval value for ERROR TIMER to mobile station 80 from time to time. Correspondingly, base station 60 changes the interval value for its own ERROR TIMER.

If the counter NO._RESETS has not reached the predetermined maximum number of tolerable errors, mobile station 80 proceeds to step 290 and resets the counter NO._RESETS, then proceeds back to step 270. The result is that mobile station 80 has detected at least one error during the predetermined time interval measured by ERROR TIMER, but has not detected enough errors to consider the traffic channel as unacceptable, so mobile station 80 essentially forgets about the errors and keeps using the traffic channel.

If the counter NO._RESETS has reached the predetermined maximum number of tolerable errors, mobile station 80 proceeds to step 295 and executes exception processing.

Several possibilities exist for exception processing. In one embodiment, the conventional IS 136 Revision A fade timer processing may be used, as described in Section 2.4.3.3 of volume 2 of IS 136 Revision A as an embodiment of the flowchart of FIG. 2B. As typically implemented, the IS 136 Revision A fade timer routine comprises detecting three bad color codes in respective consecutive received frames, which corresponds to (i) setting the predetermined interval value for ERROR TIMER to a value for three frames, such as (3) ×(25 milliseconds), to arrive at a value such as 0.075 seconds; and (ii) setting the predetermined maximum number of tolerable errors for the counter NO._RESETS to a value of 3. In this case, the exception processing comprises dropping the call thereby forcing the calling parties to establish a new connection.

In another embodiment, the exception processing at step 295 automatically establishes a new channel using the facilities of the existing service provider. Sometimes this procedure is referred to as an autonomous intra-system handoff.

In a further embodiment, the exception processing at step 295 automatically establishes a new channel using the facilities of a different service provider. It will be recalled that in non-PCS wireless services, in accordance with the policy of the Federal Communications Commission, there are at least two service providers in each area, an "A" side telephone company and a "B" side non-telephone company; for PCS wireless services, there can be up to five service providers in each area. When initiated by a mobile station, this automatic inter-system provider transfer procedure is referred to as a mobile assisted handoff (MAHO).

Frame counter initialization during registration will now be described. Registration processing is set forth in sections 6.3.12.5 and 6.3.12.7 of volume 1 of IS 136 Revision A.

As illustrated in FIG. 3, at step 310 during registration, each of the stations participating therein determines whether an authentication procedure is in use by referencing descriptive information for mobile station 80. In particular, mobile station 80 refers to information stored in memory 82 of FIG. 1C, while base station 60 refers to information stored in storage 35 of FIG. 1B. If mobile station 80 has communication system 30 as its home system, then communication system 30 includes specific profile information defining whether mobile station 80 uses an authentication procedure. If mobile station 80 is a foreign or roaming station, that is, does not have communication system 30 as its home system, then mobile station 80 sends a domain indicator to base station 60 during registration, identifying the capabilities of mobile station 80, as described in IS 136 Revision A volume 1 section 6.4.4.5.

If an authentication procedure is not in use, then a predetermined value, such as zero or a non-zero number, is used as the frame counter initial value at step 320.

If an authentication procedure is in use, then, at step 330, a frame counter initial value is obtained from the authentication procedure. Typically, base station 60 and mobile station 80 each generate a cryptographic key, a portion of which is selected as the frame counter initial value. For example, for use with IS 136 Revision A, base station 60 and mobile station 80 each generate a 520 bit cryptographic key in accordance with TR45.0.A, "Common Cryptographic Algorithms", Apr. 25, 1995, available from the Telecommunications Industry Association, referred to herein as the "CCA document" and incorporated herein by reference. Each station divides the 520 bit key into a first 260 bit key to be used for uplink communication and a second 260 bit key to be used for downlink communication. Base station 60 uses the 24 most significant bits of one of the uplink and downlink keys as its frame counter FCB initial value. Mobile station 80 uses the 24 most significant bits of the other of the uplink and downlink keys as its frame counter FCM initial value.

After the frame counter initial value has been obtained, at step 340 it is stored. At step 350, the frame counter is set to the stored initial value, and registration continues.

Frame counter resetting and re-initialization after registration will now be described.

Conventional frame processing carried out by each of the transmitting and receiving stations is modified in accordance with FIG. 4, which will be described from the viewpoint of a receiving station, although it will be apparent that the transmitting station performs complementary actions.

At step 410, the receiving station checks whether a received frame indicates a new traffic channel assignment. If not, the receiving station proceeds to step 420, and checks whether the received frame includes a re-authenticate command. If not, the receiving station proceeds to step 490 and completes its frame processing.

If, at step 420, the receiving station determines that a re-authenticate command is included in the received frame, then the receiving station proceeds to step 430 and obtains a new frame counter initial value, in similar manner as described with respect to step 330 of FIG. 3. Due to use of the procedure described in the CCA document, the new frame counter initial value is a substantially random number with respect to the previous frame counter initial value. This situation may occur, for example, if an application using the frame counter is configured to reset the frame counter from time to time, such as to increase security. At step 440, the new frame counter initial value is stored, and at step 450, the frame counter is reset, specifically, set to the newly stored frame counter initial value. The receiving station proceeds to step 490 and completes its frame processing.

It is an important aspect of the present invention that the frame counter is aperiodically reset to a new initial value which is a substantially random number with respect to a previous initial value.

If, at step 410, the receiving station determines that the received frame indicates a new traffic channel assignment, then processing flows to step 460. At step 460, the receiving station determines whether the received frame also indicates a new service provider assignment.

If, at step 460, a new service provider has not been assigned, then the receiving station proceeds to step 470 and checks whether the received frame includes a re-authenticate command. This point may represent, for example, a base station to base station handoff of a mobile station, or switching to a new traffic channel as part of exception processing as indicated in step 295 of FIG. 2B. If a re-authentication command is not included in the received frame, at step 450 of FIG. 4, the receiving station simply resets its frame counter to the stored frame counter initial value. If a re-authentication command is included in the received frame, at steps 430–450, the receiving station obtains a new frame counter initial value, stores it, and sets the frame counter to the new frame counter initial value, as described above. Re-authentication is described in section 7.2 of volume 1 of IS 136 Revision A, and in U.S. patent application Ser. No. 08/681,753, filed on Jul. 29, 1996, now pending, the disclosure of which is incorporated herein by reference.

If, at step 460, a new service provider has been assigned, then the receiving station proceeds to step 480 and determines whether authentication is required. If authentication is not required, at step 450 of FIG. 4, the receiving station simply resets its frame counter to the stored frame counter initial value. If authentication is required, at step 485, the receiving station obtains a new frame counter initial value, and at steps 440–450, stores the new frame counter initial value, and sets the frame counter to the new frame counter initial value, as described above.

The present technique may be used to expand the length of short message service (SMS) data sent from a base station to a mobile station. Conventionally, the maximum amount of data delivered via SMS is restricted by the amount which can be accommodated in one frame, such as 190 octets for digital control channel (DCCh) and digital traffic channel (DTC). Longer SMS data amounts can be used with the present frame counter, since the frame counter allows detection of lost messages.

The present technique facilitates over-the-air activation service, which essentially uses SMS data message exchange to download information such as a new mobile identification number (MIN) or a new authentication key (A-Key). Since a plurality of messages are exchanged, it is helpful to use the present frame counter to allow detection of lost messages.

Generally, layer 4 teleservices, both analog and digital, are candidates for application of the frame counter.

Additionally, the present frame counter can be used to provide a "long code" or frequency hopping sequence, for a code division multiple access (CDMA) transmission.

For use with analog voice channel encryption, the frame counter is shifted with the supervisory audio tone (SAT) to alter the voice output signal while keeping it within the proper bandwidth. SAT phase shift indicates whether to turn voice encryption on or off.

In a wireless system using analog voice transmission, the present invention may be used with a digital implementation of the control channel.

Although the embodiments described above have been in the context of a wireless communication system, it will be appreciated that a wireline communication system is also an appropriate environment for the frame counter described herein. In particular, synchronized secure transmission over wirelines is facilitated using the frame counter described above, which can be set with any initial value such as a non-zero initial value.

For use with asynchronous transfer mode (ATM) packet data, the length of the frame counter is increased to match the length of the sequence number and the information data in an ATM packet. The most significant bits of the frame counter, e.g., 24 bits, are used to encrypt the ATM packet sequence number. The remainder of the frame counter, e.g., 724 bits, is used to encrypt the information data. The destination address remains unencrypted.

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

What is claimed is:

1. A method for providing synchronized wireless communication between a first station and a second station, comprising the steps of:
   receiving, at the first station, a frame of data including an identifier uniquely identifying a communication channel designated for communication between the first station and the second station, and
   incrementing, at the first station, a frame counter which is aperiodically reset to a new initial value, the new initial value being a substantially random number with respect to a previous initial value, the step of incrementing the frame counter occurring after the step of receiving the frame of data.

2. The method of claim 1, wherein the identifier is a color code.

3. The method of claim 1, further comprising the step of transmitting, from the first station to the second station, a return frame including an expected value as a return frame identifier.

4. The method of claim 1, further comprising the step of resetting the frame counter to the new initial value when the value of the identifier in the received frame is other than an expected value.

5. The method of claim 4, further comprising the step of incrementing a reset counter after the step of resetting the frame counter, the reset counter being different than the frame counter.

6. The method of claim 5, further comprising the step of performing exception processing when the reset counter reaches a predetermined value.

7. The method of claim 6, wherein a call is in progress between the first station and the second station, and the exception processing includes dropping the call.

8. The method of claim 6, wherein the exception processing is an intra-system handoff routine.

9. The method of claim 6, wherein the exception processing is an inter-system handoff routine.

10. The method of claim 5, further comprising the step of resetting the reset counter when the reset counter has not reached a predetermined value and a predetermined error interval has elapsed since the first occurrence of the step of incrementing the reset counter.

11. The method of claim 4, further comprising the step of transmitting, from the first station to the second station, a return frame including a selected value other than an expected value as a return frame identifier after the step of resetting.

12. The method of claim 1, further comprising the step of resetting the frame counter to the new initial value in response to assignment of a new traffic channel.

13. The method of claim 1, further comprising the step of storing the new initial value.

14. The method of claim 1, wherein the new initial value is obtained from an authentication procedure or a re-authentication procedure.

15. A first station for participating in wireless communication with a second station, comprising:

means for receiving a frame of data including an identifier uniquely identifying a communication channel designated for communication between the first station and the second station, and means for incrementing a frame counter after receiving the frame of data, the frame counter being aperiodically reset to a new initial value, the new initial value being a substantially random number with respect to a previous initial value.

16. The first station of claim 15, wherein the identifier is a color code.

17. The first station of claim 15, further comprising means for transmitting a return frame including an expected value as a return frame identifier.

18. The first station of claim 15, further comprising means for resetting the frame counter to the new initial value when the value of the identifier in the received frame is other than an expected value.

19. The first station of claim 18, further comprising means for incrementing a reset counter, the reset counter being different than the frame counter.

20. The first station of claim 18, further comprising means for transmitting a return frame including a selected value other than an expected value as a next frame identifier.

21. The first station of claim 15, further comprising means for resetting the frame counter to the new initial value in response to assignment of a new traffic channel.

22. The first station of claim 15, further comprising means for storing the new initial value.

23. The first station of claim 15, wherein the new initial value is obtained from an authentication procedure or a re-authentication procedure.

24. The first station of claim 15, wherein the first station is a mobile station.

25. The first station of claim 15, wherein the first station is a base station.

\* \* \* \* \*